US012658433B2

(12) United States Patent　　Choi et al.

(10) Patent No.:　US 12,658,433 B2
(45) Date of Patent:　Jun. 16, 2026

(54) POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Moon Ho Choi, Cheongju-si (KR); Gwang Seok Choe, Cheongju-si (KR); Jun Won Suh, Cheongju-si (KR); Jin Kyeong Yun, Cheongju-si (KR); Jung Han Lee, Cheongju-si (KR); Seung Woo Choi, Cheongju-si (KR); Joong Ho Bae, Cheongju-si (KR); Du yeol Kim, Cheongju-si (KR)

(73) Assignee: ECOPRO, Cheongju-si (KR)

( * ) Notice: Subject to any disclaimer, the term of this patent is extended or adjusted under 35 U.S.C. 154(b) by 0 days.

(21) Appl. No.: 17/224,652

(22) Filed: Apr. 7, 2021

(65) Prior Publication Data

US 2021/0399297 A1　　Dec. 23, 2021

(30) Foreign Application Priority Data

Jun. 18, 2020　(KR) ......................... 10-2020-0074253

(51) Int. Cl.
　H01M 4/525　　　(2010.01)
　H01M 4/505　　　(2010.01)
　　　　(Continued)

(52) U.S. Cl.
　CPC ........... H01M 4/525 (2013.01); H01M 4/505 (2013.01); H01M 10/0525 (2013.01);
　　　　(Continued)

(58) Field of Classification Search
　CPC ....... H01M 4/505; H01M 4/525; H01M 4/366
　See application file for complete search history.

(56) References Cited

U.S. PATENT DOCUMENTS

2011/0104569 A1 * 5/2011 Sugaya ............... H01M 4/1391
　　　　　　　　　　　　　　　429/223
2014/0158932 A1 * 6/2014 Sun ........................ H01M 4/139
　　　　　　　　　　　　　　　252/182.1
　　　　　　(Continued)

FOREIGN PATENT DOCUMENTS

CN　　107093740 A　　8/2017
CN　　110858649 A　　3/2020
　　　　　(Continued)

OTHER PUBLICATIONS

KR20190093454A translation from Espacenet (Year: 2019).*
　　　　　(Continued)

*Primary Examiner* — Nathanael T Zemui

(74) *Attorney, Agent, or Firm* — Studebaker Brackett PLLC

(57) ABSTRACT

The present invention relates to a positive electrode active material and a lithium secondary battery including the same, and more particularly, to a bimodal-type positive electrode active material that includes a first lithium composite oxide which is a small particle and a second lithium composite oxide which is a large particle, which have different average particle diameters, thereby improving an increasing deviation of an average particle diameter and degraded impedance and lifetime characteristics due to excessive calcination for any one of the small and large particles during simultaneous calcination, a positive electrode including the same, and a lithium secondary battery using the same.

10 Claims, 5 Drawing Sheets

(51) Int. Cl.
 *H01M 10/0525* (2010.01)
 *H01M 4/02* (2006.01)

(52) U.S. Cl.
 CPC ........................... *H01M 2004/021* (2013.01);
  *H01M 2004/028* (2013.01); *H01M 2220/20*
  (2013.01)

(56) References Cited

U.S. PATENT DOCUMENTS

| | | | | |
|---|---|---|---|---|
| 2017/0133675 | A1* | 5/2017 | Zhu | C01G 53/44 |
| 2018/0287135 | A1* | 10/2018 | Shin | C01G 53/50 |
| 2019/0148717 | A1* | 5/2019 | Choi | H01M 10/052 |
| | | | | 429/209 |
| 2020/0266438 | A1* | 8/2020 | Han | H01M 10/0525 |
| 2021/0036319 | A1* | 2/2021 | Oh | H01M 4/505 |
| 2022/0006081 | A1* | 1/2022 | Choi | C01G 53/00 |
| 2022/0009791 | A1* | 1/2022 | Yang | H01M 4/0497 |
| 2022/0059832 | A1* | 2/2022 | Han | H01M 4/525 |
| 2023/0174388 | A1* | 6/2023 | Bergner | H01M 4/131 |
| | | | | 429/223 |

FOREIGN PATENT DOCUMENTS

| | | | |
|---|---|---|---|
| CN | 110993936 | A | 4/2020 |
| CN | 111226330 | A | 6/2020 |
| JP | 2015-026594 | A | 2/2015 |
| JP | 2019-096612 | A | 6/2019 |
| JP | 2020-029396 | A | 2/2020 |
| JP | 2020-035605 | A | 3/2020 |
| KR | 10-2019-0051864 | A | 5/2019 |
| KR | 10-2019-0093454 | A | 8/2019 |
| KR | 10-2020-0022321 | A | 3/2020 |
| WO | 2019/103460 | A1 | 5/2019 |

OTHER PUBLICATIONS

Li Wangda et al., "High-nickel layered oxide cathodes for lithium-based automotive batteries", Nature Energy, vol. 5, No. 1, Jan. 1, 2020, pp. 26-34.
Logan E. R. et al., "A Comparison of the Performance of Different Morphologies of $LiNi0.8Mn0.1Co0.1O2$ Using sothermal Microcalorimetry, Ultra-High Precision Coulometry, and Long-Term Cycling", Journal of the Electrochemical Society, vol. 167, No. 6, Apr. 14, 2020, pp. 060530 (1-14).

* cited by examiner

POSITIVE ELECTRODE ACTIVE MATERIAL AND LITHIUM SECONDARY BATTERY COMPRISING THE SAME

CROSS-REFERENCE TO RELATED APPLICATION

This application claims priority to and the benefit of Korean Patent Application No. 10-2020-0074253, filed on Jun. 18, 2020, the disclosure of which is incorporated herein by reference in its entirety.

BACKGROUND

1. Field of the Invention

The present invention relates to a positive electrode active material and a lithium secondary battery including the same, and more particularly, to a bimodal-type positive electrode active material including a first lithium composite oxide, which is a small particle, and a second lithium composite oxide, which is a large particle, these particles having different particle diameters, wherein the positive electrode active material makes it possible to improve an increase in deviation of average particle diameter, and a decrease in impedance and lifetime characteristics due to excessive calcination of one or more of the small particles and the large particles in simultaneous calcination, a positive electrode including the positive electrode active material, and a lithium secondary battery using the same.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

Meanwhile, recently, for a high capacity lithium secondary battery, a bimodal-type positive electrode active material in which small particles and large particles, which have different average particle diameters, are mixed, are often used. When small particles and large particles are mixed, voids between the large particles can be filled with small particles with relatively small average particle diameters, so that the integration density of a lithium composite oxide in unit volume may be enhanced and thus the energy density per unit volume may increase.

However, according to simultaneous calcination after mixing of small particles and large particles, small particles with a relatively smaller average particle diameter than large particles are excessively calcined, and therefore the deviation in average particle diameter is larger or the impedance and lifetime characteristics are degraded.

SUMMARY OF THE INVENTION

In the lithium secondary battery market, the growth of lithium secondary batteries for electric vehicles plays a leading role, and the demand for positive electrode materials used in lithium secondary batteries is also constantly changing.

For example, conventionally, in terms of securing safety, lithium secondary batteries using LFP have been mainly used. However, recently, the use of a nickel-based lithium composite oxide, which has a larger energy capacity per weight than LFP, is expanding.

In line with the trend of the positive electrode active materials, the present invention is directed to providing a bimodal-type positive electrode active material, which includes a first lithium composite oxide, which is a small particle, and a second lithium composite oxide, which is a large particle, the particles having different average particle diameters, and therefore, the positive electrode active material has a high energy density.

Particularly, the present invention is directed to providing a positive electrode active material, which prevents excessive calcination for any one of small and large particles by reducing the deviation in metal elements in the small and large particles of the bimodal-type positive electrode active material so as to reduce the difference in average particle diameter before and after calcination or prevent deterioration of the positive electrode active material in advance, resulting in enhancing electrical characteristics.

The present invention is also directed to providing a positive electrode including the positive electrode active material defined herein.

The present invention is also directed to providing a lithium secondary battery using the positive electrode defined herein.

The objects of the present invention are not limited to the above-mentioned objects (e.g., for electric cars), and other objects and advantages of the present invention which are not mentioned can be understood by the following description and more clearly understood by exemplary embodiments of the present invention. In addition, it will be readily apparent that the objects and advantages of the present invention may be realized by the means indicated by the claims and a combination thereof.

One aspect of the present invention provides a bimodal-type positive electrode active material, which includes a first lithium composite oxide, which is a small particle, and a second lithium composite oxide, which is a large particle. Here, an Mn concentration ($\alpha$) in the first lithium composite oxide and an Mn concentration ($\beta$) in the second lithium composite oxide satisfy the following Equation 1 so that the calcination temperature deviation of the small and large particles can be reduced.

$$|\alpha(\text{mol \%}) - \beta(\text{mol \%})| \leq 2.0 \qquad \text{[Equation 1]}$$

In addition, the first lithium composite oxide and the second lithium composite oxide may be represented by Formula 1 below.

$$Li_wNi_{1-(x+y+z)}Co_xMn_yM1_zO_{2+\delta} \qquad \text{[Formula 1]}$$

(Here, M1 is at least one selected from P, Sr, Ba, B, Ti, Zr, Al, W, Ce, Hf, Ta, Cr, F, Mg, Cr, V, Fe, Zn, Si, Y, Ga, Sn, Mo, Ge, Nd, Gd and Cu, $0.5 \leq w \leq 1.5$, $0 \leq x \leq 0.50$, $0 \leq y \leq 0.20$, $0 \leq z \leq 0.20$, and $0 \leq \delta \leq 0.02$.)

Here, the positive electrode active material may be a high-Ni-type lithium composite oxide in which the Ni, Co and Mn concentration (mol %) in at least one of the first lithium composite oxide and the second lithium composite oxide satisfies the following Equation 2.

$$Ni/(Ni+Mn+Co) \geq 85.0 \qquad \text{[Equation 2]}$$

The first lithium composite oxide and the second lithium composite oxide may be in the form of an aggregate including primary particles enabling the intercalation/deintercalation of lithium and secondary particles in which the primary particles are aggregated.

Here, at least one of the first lithium composite oxide and the second lithium composite oxide may include a coating layer covering at least a part of the region selected from the interface between the primary particles and the surface of the secondary particle.

Here, the coating layer may include at least one lithium alloy oxide represented by Formula 2 below.

$$Li_aM2_bO_c \qquad \text{[Formula 2]}$$

(Here, M2 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq a \leq 10$, $0 \leq b \leq 8$, and $2 \leq c \leq 13$.)

In addition, another aspect of the present invention provides a positive electrode including the positive electrode active material defined herein.

Moreover, still another aspect of the present invention provides a lithium secondary battery using the positive electrode defined herein.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
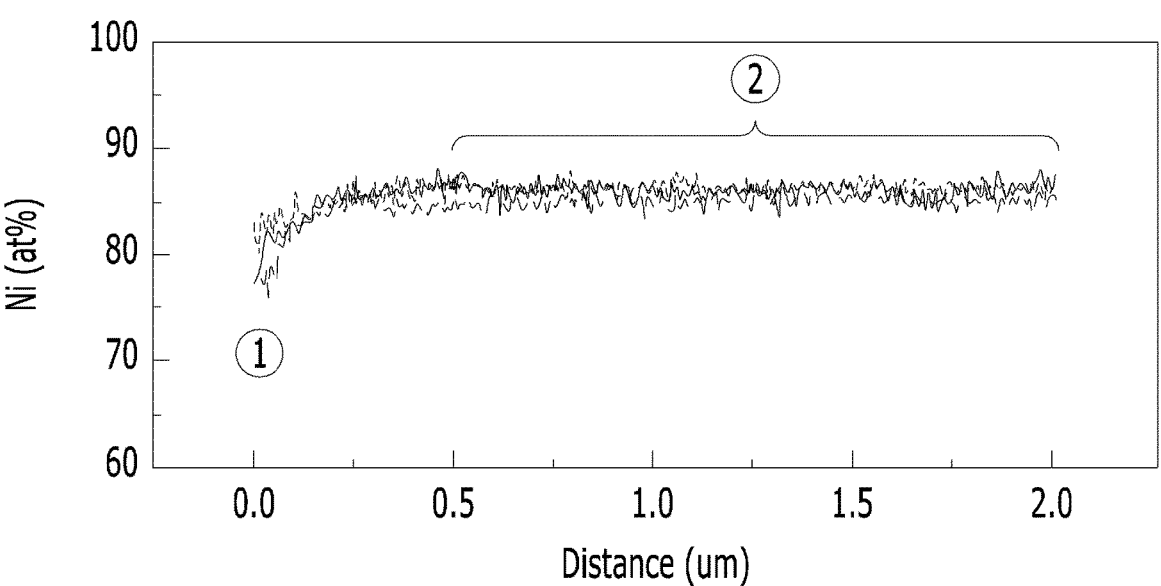
FIGS. 1 to 3 are graphs showing EDS analysis results for the distribution and contents of metal elements according to a location in a particle for a first lithium composite oxide, which is a small particle, of a positive electrode active material according to Example 3.

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

Hereinafter, a positive electrode active material according to the present invention, and a lithium secondary battery including the same will be described in detail.

Positive Electrode Active Material

According to one aspect of the present invention, a bimodal-type positive electrode active material including a first lithium composite oxide, which is a small particle, and a second lithium composite oxide, which is a large particle, is provided. In the present invention, the small particle refers to a lithium composite oxide having an average particle diameter (D50) of 8 μm or less, and the large particle refers to a lithium composite oxide having an average particle diameter (D50) of 8.5 μm or more. The upper limit of the average particle diameter (D50) of the large particle has no limit, but for example, the large particle may have an average particle diameter of 8.5 to 23.0 μm.

The positive electrode active material is a bimodal-type positive electrode active material in which the first lithium composite oxide and the second lithium composite oxide, which exhibit the above-defined average particle diameters (D50), are mixed in a weight ratio of 5:95 to 50:50. Here, the first lithium composite oxide and the second lithium composite oxide may refer to a positive electrode active material which is prepared by mixing different types of lithium composite oxides in a precursor step before calcination and then simultaneously calcining the oxides, rather than being simply prepared by calcining them individually and physically mixing them such that the first lithium composite oxide is charged in voids of the second lithium composite oxide. Here, the first lithium composite oxide may not only be present in voids between the second lithium composite oxides, but may also be adhered to the surface of the second lithium composite oxide or present in the form of an aggregate.

Meanwhile, the first lithium composite oxide and the second lithium composite oxide of the positive electrode active material may be present in a weight ratio of 5:95 to 50:50, and preferably 10:90 to 30:70. More preferably, the first lithium composite oxide may be present at more than 10 wt % and less than 30 wt %, and the second lithium composite oxide may be present at more than 70 wt % and less than 90 wt % with respect to the total weight of the first lithium composite oxide and the second lithium composite oxide.

As the first lithium composite oxide and the second lithium composite oxide in the positive electrode active material are present in the above-mentioned range of weight ratio, it is possible to improve the energy density per unit volume without significant degradation in other electrical properties of the positive electrode active material.

In one embodiment of the present invention, an Mn concentration ($\alpha$) in the first lithium composite oxide of the positive electrode active material and an Mn concentration ($\beta$) in the second lithium composite oxide thereof satisfy the following Equation 1.

$$|\alpha(\text{mol } \%) - \beta(\text{mol } \%)| \leq 2.0 \qquad \text{[Equation 1]}$$

Equation 1 means that the absolute value of the difference between the Mn concentration ($\alpha$) in the first lithium composite oxide and the Mn concentration ($\beta$) in the second lithium composite oxide is 2.0 or less.

The Mn concentration ($\alpha$) in the first lithium composite oxide of the positive electrode active material and the Mn concentration ($\beta$) in the second lithium composite oxide thereof may depend on Mn concentrations in hydroxide precursors of the first lithium composite oxide and the second lithium composite oxide before calcination. That is, when the absolute value of the difference between an Mn concentration ($\alpha'$) in the hydroxide precursor of the first lithium composite oxide (first hydroxide precursor) and an Mn concentration ($\beta'$) in the hydroxide precursor of the second lithium composite oxide (second hydroxide precursor) is 2.0 or less, the first lithium composite oxide and the second lithium composite oxide, which are calcination products of the first hydroxide precursor and the second hydroxide precursor may satisfy the above-mentioned Equation 1.

The Mn concentration in the hydroxide precursor may affect a calcination temperature of the hydroxide precursor. Specifically, as the Mn concentration in the hydroxide precursor increases, the calcination temperature, which is a thermal treatment temperature for converting the hydroxide precursor into an oxide type, should be increased.

Bimodal-type positive electrode active materials according to various embodiments of the present invention are prepared by simultaneous calcination of a mixture of the first hydroxide precursor and the second hydroxide precursor, rather than individual calcination of the first hydroxide precursor and the second hydroxide precursor during the preparation process.

When the first lithium composite oxide and the second lithium composite oxide, which are products obtained by individually calcining the first hydroxide precursor and the second hydroxide precursor, are physically mixed, it may be difficult to effectively fill the voids between the second lithium composite oxides, which are large particles, with the first lithium composite oxide having a relatively small average particle diameter. In this case, the integration density of the lithium composite oxide in a unit volume and the energy density per unit volume thereof may not be sufficiently improved.

As described above, when a bimodal-type positive electrode active material is prepared through simultaneous calcination of the mixture of the hydroxide precursor and the second hydroxide precursor, the calcination temperature may be controlled according to the Mn concentrations in the first hydroxide precursor and the second hydroxide precursor.

Meanwhile, in the case of the first hydroxide precursor with a relatively small average particle diameter, since a BET specific surface area is larger compared with the second hydroxide precursor, and therefore, the amount of heat applied to the precursor through heat treatment is greater, the average particle diameter of the first hydroxide precursor may be larger than that of the second hydroxide precursor.

Here, when the difference in Mn concentration between the first hydroxide precursor and the second hydroxide precursor is excessively large (particularly, when the Mn concentration of the first hydroxide precursor is larger than that of the second hydroxide precursor), a relatively higher calcination temperature is required to completely calcine the first hydroxide precursor. In this case, there is a concern that the deviation in average particle diameter of the first lithium composite oxide, which is a calcination product of the first hydroxide precursor, is unnecessarily greater. In addition, due to the excessive calcination of the first hydroxide precursor, early deterioration of the first lithium composite oxide, which is the calcination product, may occur.

Accordingly, as the absolute value of the difference between the Mn concentration ($\alpha'$) in the first hydroxide precursor and the Mn concentration ($\beta'$) in the second hydroxide precursor, which are precursors before calcination of the bimodal-type positive electrode active material is 2.0 or less, and further, the absolute value of the difference between the Mn concentration ($\alpha$) in the first lithium composite oxide and the Mn concentration ($\beta$) in the second lithium composite oxide satisfies 2.0 or less, excessive deviation in average particle diameter of the first lithium composite oxide and/or the second lithium composite oxide before and after calcination or deterioration caused by excessive calcination of the first lithium composite oxide and/or the second lithium composite oxide can be prevented.

When the absolute value of the difference between the Mn concentration ($\alpha'$) in the first hydroxide precursor and the Mn concentration ($\beta'$) in the second hydroxide precursor is more than 2.0, or the absolute value of the difference between the Mn concentration ($\alpha$) in the first lithium composite oxide and the Mn concentration ($\beta$) in the second lithium composite oxide is more than 2.0, the electrical characteristics of the bimodal-type positive electrode active material, which is the calcination product, and there is a risk of degradation.

Meanwhile, the first lithium composite oxide and the second lithium composite oxide may be represented by Formula 1 below.

$$Li_wNi_{1-(x+y+z)}Co_xMn_yM1_zO_{2+\delta} \qquad \text{[Formula 1]}$$

(Here, M1 is at least one selected from P, Sr, Ba, B, Ti, Zr, Al, W, Ce, Hf, Ta, Cr, F, Mg, Cr, V, Fe, Zn, Si, Y, Ga, Sn, Mo, Ge, Nd, Gd and Cu, $0.5 \leq w \leq 1.5$, $0 \leq x \leq 0.50$, $0 \leq y \leq 0.20$, $0 \leq z \leq 0.20$, and $0 \leq \delta \leq 0.02$.)

Here, at least one of the first lithium composite oxide and the second lithium composite oxide may have a concentration gradient in which the concentration of at least one selected from Ni, Co and Mn, and preferably, Ni and/or Co increases or decreases from the center of the particle to the surface of the particle.

The concentration gradient of at least one selected from Ni, Co and Mn may be a concentration gradient which continuously or discontinuously increases or decreases from the center of the particle to the surface of the particle.

Due to the above-described concentration gradient in the first lithium composite oxide and/or the second lithium composite oxide, a lithium ion diffusion path may be formed in the direction from the center of the particle to the surface of the particle in the first lithium composite oxide and/or the second lithium composite oxide. Here, the lithium ion diffusion path may be formed in the same direction as the direction of the concentration gradient of at least one selected from Ni, Co and Mn (or the direction from the center of the particle to the surface thereof), or may be present while forming an angle within ±40° with respect to a virtual straight light connecting the center of the particle with the surface thereof.

Like this, as the lithium ion diffusion path in the first lithium composite oxide and/or the second lithium composite oxide is formed in the direction from the center of the particle to the surface of the particle, the diffusion property of lithium ions in the positive electrode active material may be improved, and this may contribute to the improvement in electrical characteristics of the positive electrode active material.

Meanwhile, in another embodiment, at least one of the first lithium composite oxide and the second lithium composite oxide may have a constant Mn concentration from the center of the particle to the surface of the particle.

For example, as at least one of the first lithium composite oxide and the second lithium composite oxide has a constant Mn concentration from the center to the surface of the particle, the elution of Mn in the lithium composite oxide into the electrolyte may be prevented, and early deterioration of the positive electrode active material caused thereby may be inhibited.

In addition, the first lithium composite oxide and/or second lithium composite oxide, and preferably, the Ni, Co and Mn concentrations (mol %) in the first lithium composite oxide and the second lithium composite oxide may satisfy Equation 2 below.

$$Ni/(Ni+Mn+Co) \geq 85.0 \qquad \text{[Equation 2]}$$

According to Equation 2, the first lithium composite oxide and/or the second lithium composite oxide, and preferably, the first lithium composite oxide and the second lithium composite oxide may be high-Ni-containing lithium composite oxides, and even when the nickel content in the lithium composite oxide is 85% or more, early deterioration may be sufficiently inhibited.

In addition, the first lithium composite oxide and the second lithium composite oxide may be formed in the form of an aggregate including primary particles enabling lithium intercalation/deintercalation and secondary particles in which the primary particles are aggregated.

The primary particle refers to one grain or crystallite, and the secondary particle refers to an aggregate formed by aggregating a plurality of primary particles. There may be voids and/or a grain boundary between the primary particles constituting the secondary particle.

Here, at least one of the first lithium composite oxide and the second lithium composite oxide may include a coating layer that covers at least a part of the surface(s) of the primary particle (e.g., the interface between the primary particles) and/or a secondary particle formed by aggregating the primary particles.

For example, the coating layer may be present while covering at least a part of an exposed surface of the primary particle. Particularly, the coating layer may be present while covering at least a part of the exposed surface of the primary particle present at the outmost part of the secondary particle.

Accordingly, the coating layer may be present as a layer that continuously or discontinuously coats the surface(s) of the primary particle and/or the secondary particle formed by aggregating the primary particles. When the coating layer is discontinuously present, it may be present in an island shape.

The coating layer present as such may contribute to improvement in physical and electrochemical characteristics of the positive electrode active material. When the coating layer is present, the thickness of the coating layer is preferably 0.15 μm or more.

In addition, the coating layer may be present in the form of a solid solution that does not form a boundary between the primary particle and/or the secondary particle formed by aggregating the primary particles.

The coating layer may include at least one lithium alloy oxide represented by Formula 2 below. That is, the coating layer may be defined as a region in which the lithium alloy oxide represented by Formula 2 below is present.

$$Li_aM2_bO_c \qquad \text{[Formula 2]}$$

(Here, M2 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq a \leq 10$, $0 \leq b \leq 8$, and $2 \leq c \leq 13$.)

In addition, the coating layer may have a form in which different types of lithium alloy oxides are present in one layer, or different types of lithium alloy oxides represented by Formula 2 above are present in separate layers.

The lithium alloy oxide represented by Formula 2 above may be physically and/or chemically bound with the primary particle represented by Formula 1. In addition, the lithium alloy oxide may be formed in a solid solution with the primary particles represented by Formula 1.

The positive electrode active material according to the embodiment may include a coating layer covering at least a part of the surface(s) of the primary particle (e.g., the interface between the primary particles) and/or the secondary particle formed by aggregating the primary particles, thereby increasing structural stability. In addition, when such a positive electrode active material is used in a lithium secondary battery, the high-temperature stability and lifetime characteristics of the positive electrode active material may be improved. In addition, since the lithium alloy oxide may reduce residual lithium in the positive electrode active material and serve as a migration pathway of lithium ions, there may be an effect of improving the efficiency characteristics of the lithium secondary battery.

In addition, in some cases, the lithium alloy oxide may not be present on at least a part of the interface between the primary particles and the surface of the secondary particle, but also present in internal voids formed in the secondary particle.

The lithium alloy oxide is an oxide in which lithium and an element represented by A or an oxide of A are combined, and may be, for example, $Li_aW_bO_c$, $Li_aZr_bO_c$, $Li_aTi_bO_c$, $Li_aNi_bO_c$, $Li_aB_bO_c$, $Li_aCo_bO_c$, $Li_aAl_bO_c$, $Co_bO_c$, $Al_bO_c$, $W_bO_c$, $Zr_bO_c$, $Ti_bO_c$ or $B_bO_c$, but the above examples are merely described for convenience of understanding, and the oxide defined in the present invention is not limited to the above-described examples.

In another embodiment, the lithium alloy oxide may be or may further include an oxide in which lithium and at least two types of elements represented by A are combined. The lithium alloy oxide in which lithium and at least two types of elements represented by A are combined may be, for example, $Li_a(W/Ti)_bO_c$, $Li_a(W/Zr)_bO_c$, $Li_a(W/Ti/Zr)_bO_c$, or $Li_a(W/Ti/B)_bO_c$, but the present invention is not necessary limited thereto.

Here, the lithium alloy oxide may have a concentration gradient decreasing from the surface to the center of the secondary particle. Accordingly, the concentration of the lithium alloy oxide may decrease from the outermost surface of the secondary particle to the center of the secondary particle.

As described above, as the lithium alloy oxide has a concentration gradient decreasing from the surface to the center of the secondary particle, residual lithium present on the surface of the positive electrode active material may be effectively reduced, thereby preventing a side reaction caused by unreacted residual lithium in advance. In addition, a decrease in crystallinity in the inner surface region of the positive electrode active material caused by the oxide may be prevented. In addition, the breakdown of the entire structure of the positive electrode active material due to the oxide in an electrochemical reaction may be prevented.

In addition, the coating layer may include a first oxide layer including at least one oxide represented by Formula 2, and a second oxide layer which includes at least one oxide represented by Formula 2, which is a different oxide from the oxide included in the first oxide layer.

For example, the first oxide layer may be present while covering at least a part of the exposed surface of the primary particle present on the outermost surface of the secondary particle, and the second oxide layer may be present while covering at least a part of the exposed surface of the primary particle not covered by the first oxide layer and the surface of the first oxide layer.

Lithium Secondary Battery

Another aspect of the present invention may provide a positive electrode including a positive electrode current collector and a positive electrode active material layer formed on the positive electrode current collector. Here, the positive electrode active material layer may include positive electrode active materials according to various embodiments of the present invention. Therefore, since the positive electrode active material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0 \le \beta \le 2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt. The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Preparation Example 1. Preparation of Positive
Electrode Active Material (1) Example 1

A hydroxide precursor of a first lithium composite oxide, which is a small particle, and a second lithium composite oxide, which is a large particle, was synthesized by a co-precipitation method using sulfur, nickel, cobalt sulfate and manganese sulfate.

The hydroxide precursor was a mixture of a small particle precursor having an average particle diameter (D50) of 4.0 μm or less, and a large particle precursor having an average particle diameter (D50) of 16.0 μm or more, and the weight ratio of the small particle precursor and the large particle precursor of the mixture was controlled to be 20:80.

Subsequently, the mixture of the first lithium composite oxide which is a small particle and the second lithium composite oxide which is a large particle was obtained by mixing LiOH (Li/(Ni+Co+Mn) mol ratio=1.06) with the synthesized precursor, and thermally treating the resulting mixture for 10 hours in a calcination furnace while maintaining an $O2$ atmosphere and elevating a temperature by 2° C. per minute until 690° C.

Afterward, a bimodal-type positive electrode active material was obtained by adding distilled water to the mixture for washing for 1 hour, and filtering and drying the washed mixture.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 1 below.

The compositions of the first lithium composite oxide and the second lithium composite oxide shown in Table 1 below were measured by individual calcination of the small particle precursor and the large particle precursor, and separately, the composition of the bimodal lithium composite oxide is shown as an average composition of the lithium composite oxide among a calcination product (positive electrode active material) for the mixture in which the small particle precursor and the large particle precursor are mixed in a weight ratio of 20:80.

TABLE 1

| Classification | Small particle precursor | Large particle precursor |
|---|---|---|
| Ni (mol %) | 85.1 | 90.0 |
| Co (mol %) | 13.4 | 8.5 |
| Mn (mol %) | 1.5 | 1.5 |

| Mole fraction | First lithium composite oxide | Second lithium composite oxide |
|---|---|---|
| Ni/(Ni + Co + Mn) | 85.3 | 89.9 |
| Co/(Ni + Co + Mn) | 13.1 | 8.6 |
| Mn/(Ni + Co + Mn) | 1.6 | 1.5 |

| Mole fraction | Bimodal (2:8 weight ratio) lithium composite oxide |
|---|---|
| Ni/(Ni + Co + Mn) | 88.6 |
| Co/(Ni + Co + Mn) | 9.9 |
| Mn/(Ni + Co + Mn) | 1.5 |

Referring to Table 1, it can be confirmed that the compositions of the first lithium composite oxide and the second lithium composite oxide were not significantly changed from the compositions of the precursors thereof.

(2) Example 2

A positive electrode active material was prepared in the same manner as described in Example 1, except that a hydroxide precursor of a first lithium composite oxide which is a small particle and a second lithium composite oxide which is a large particle was synthesized with the composition listed in Table 2 below.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 2 below.

The compositions of the first lithium composite oxide and the second lithium composite oxide shown in Table 2 below were measured by individual calcination of the small particle precursor and the large particle precursor, and separately, the composition of the bimodal lithium composite oxide is shown as an average composition of the lithium composite oxide among a calcination product (positive electrode active material) for the mixture in which the small particle precursor and the large particle precursor are mixed in a weight ratio of 20:80.

TABLE 2

| Classification | Small particle precursor | Large particle precursor |
|---|---|---|
| Ni (mol %) | 84.9 | 90.3 |
| Co (mol %) | 13.3 | 8.4 |
| Mn (mol %) | 1.8 | 1.3 |

| Mole fraction | First lithium composite oxide | Second lithium composite oxide |
|---|---|---|
| Ni/(Ni + Co + Mn) | 84.7 | 90.6 |
| Co/(Ni + Co + Mn) | 13.5 | 8.1 |
| Mn/(Ni + Co + Mn) | 1.8 | 1.3 |

TABLE 2-continued

| Mole fraction | Bimodal (2:8 weight ratio) lithium composite oxide |
|---|---|
| Ni/(Ni + Co + Mn) | 89.0 |
| Co/(Ni + Co + Mn) | 9.5 |
| Mn/(Ni + Co + Mn) | 1.5 |

Referring to Table 2, it can be confirmed that the compositions of the first lithium composite oxide and the second lithium composite oxide were not significantly changed from the compositions of the precursors thereof.

(3) Example 3

A hydroxide precursor of a first lithium composite oxide, which is a small particle, and a second lithium composite oxide, which is a large particle, was synthesized by a co-precipitation method using sulfur, nickel, cobalt sulfate and manganese sulfate.

The hydroxide precursor was a mixture of a small particle precursor having an average particle diameter (D50) of 4.0 μm or less, and a large particle precursor having an average particle diameter (D50) of 16.0 μm or more, and the weight ratio of the small particle precursor and the large particle precursor of the mixture was controlled to be 20:80.

Subsequently, the mixture of the first lithium composite oxide which is a small particle and the second lithium composite oxide which is a large particle was obtained by mixing LiOH (Li/(Ni+Co+Mn) mol ratio=1.06) with the synthesized precursor, and thermally treating the resulting mixture for 10 hours by raising a temperature 2° C. per minute until 690° C. in a calcination furnace while maintaining an $O_2$ atmosphere.

Afterward, distilled water was added to the mixture for washing for 1 hour, and the washed mixture was filtered and dried.

After washing the mixture, the mixture and a B-containing raw material ($H_3BO_3$) were mixed, thermally treated for 5 hours by raising a temperature 2° C. per minute until 300° C. in a calcination furnace while maintaining an $O_2$ atmosphere, and then naturally cooled, thereby obtaining a bimodal-type positive electrode active material. Here, the B-containing raw material ($H_3BO_3$) was mixed to be 0.2 wt % with respect to the total weight of the mixture.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 3 below.

The compositions of the first lithium composite oxide and the second lithium composite oxide shown in Table 3 below were measured by individual calcination of the small particle precursor and the large particle precursor, and separately, the composition of the bimodal lithium composite oxide is shown as an average composition of a lithium composite oxide among calcination products (positive electrode active materials) for the mixture in which the small particle precursor and the large particle precursor are mixed in a weight ratio of 20:80.

TABLE 3

| Classification | Small particle precursor | Large particle precursor |
|---|---|---|
| Ni (mol %) | 85.1 | 90.0 |
| Co (mol %) | 13.4 | 8.5 |
| Mn (mol %) | 1.5 | 1.5 |

| Mole fraction | First lithium composite oxide | Second lithium composite oxide |
|---|---|---|
| Ni/(Ni + Co + Mn + M) | 85.0 | 89.6 |
| Co/(Ni + Co + Mn + M) | 13.1 | 8.6 |
| Mn/(Ni + Co + Mn + M) | 1.6 | 1.5 |
| B/(Ni + Co + Mn + B) | 0.3 | 0.3 |

| Mole fraction | Bimodal (2:8 weight ratio) lithium composite oxide |
|---|---|
| Ni/(Ni + Co + Mn) | 88.7 |
| Co/(Ni + Co + Mn) | 9.5 |
| Mn/(Ni + Co + Mn) | 1.5 |
| B/(Ni + Co + Mn + B) | 0.3 |

Referring to Table 3, it can be confirmed that the compositions of the first lithium composite oxide and the second lithium composite oxide were not significantly changed from the compositions of the precursors thereof.

(4) Example 4

A positive electrode active material was prepared in the same manner as described in Example 3, except that a hydroxide precursor of a first lithium composite oxide which is a small particle and a second lithium composite oxide which is a large particle was synthesized with the composition listed in Table 4 below.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 4 below.

The compositions of the first lithium composite oxide and the second lithium composite oxide shown in Table 4 below were measured by individual calcination of the small particle precursor and the large particle precursor, and separately, the composition of the bimodal lithium composite oxide is shown as an average composition of the lithium composite oxide among a calcination product (positive electrode active material) for the mixture in which the small particle precursor and the large particle precursor are mixed in a weight ratio of 20:80.

TABLE 4

| Classification | Small particle precursor | Large particle precursor |
|---|---|---|
| Ni (mol %) | 85.0 | 88.9 |
| Co (mol %) | 10.5 | 7.5 |
| Mn (mol %) | 4.5 | 3.6 |

| Mole fraction | First lithium composite oxide | Second lithium composite oxide |
|---|---|---|
| Ni/(Ni + Co + Mn + M) | 84.6 | 88.7 |
| Co/(Ni + Co + Mn + M) | 10.5 | 7.4 |
| Mn/(Ni + Co + Mn + M) | 4.6 | 3.6 |
| B/(Ni + Co + Mn + B) | 0.3 | 0.3 |

TABLE 4-continued

| Mole fraction | Bimodal (2:8 weight ratio) lithium composite oxide |
|---|---|
| Ni/(Ni + Co + Mn) | 87.8 |
| Co/(Ni + Co + Mn) | 8.0 |
| Mn/(Ni + Co + Mn) | 3.8 |
| B/(Ni + Co + Mn + B) | 0.3 |

Referring to Table 4, it can be confirmed that the compositions of the first lithium composite oxide and the second lithium composite oxide were not significantly changed from the compositions of the precursors thereof.

(5) Example 5

A positive electrode active material was prepared in the same manner as described in Example 3, except that a hydroxide precursor of a first lithium composite oxide which is a small particle and a second lithium composite oxide which is a large particle was synthesized with the composition listed in Table 5 below.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 5 below.

The compositions of the first lithium composite oxide and the second lithium composite oxide shown in Table 5 below were measured by individual calcination of the small particle precursor and the large particle precursor, and separately, the composition of the bimodal lithium composite oxide is shown as an average composition of the lithium composite oxide among a calcination product (positive electrode active material) for the mixture in which the small particle precursor and the large particle precursor are mixed in a weight ratio of 20:80.

TABLE 5

| Classification | Small particle precursor | Large particle precursor |
|---|---|---|
| Ni (mol %) | 85.1 | 89.8 |
| Co (mol %) | 10.9 | 8.2 |
| Mn (mol %) | 4.0 | 2.0 |

| Mole fraction | First lithium composite oxide | Second lithium composite oxide |
|---|---|---|
| Ni/(Ni + Co + Mn + M) | 84.9 | 89.5 |
| Co/(Ni + Co + Mn + M) | 10.8 | 8.2 |
| Mn/(Ni + Co + Mn + M) | 4.0 | 2.0 |
| B/(Ni + Co + Mn + B) | 0.3 | 0.3 |

| Mole fraction | Bimodal (2:8 weight ratio) lithium composite oxide |
|---|---|
| Ni/(Ni + Co + Mn) | 88.6 |
| Co/(Ni + Co + Mn) | 8.7 |
| Mn/(Ni + Co + Mn) | 2.4 |
| B/(Ni + Co + Mn + B) | 0.3 |

Referring to Table 5, it can be confirmed that the compositions of the first lithium composite oxide and the second lithium composite oxide were not significantly changed from the compositions of the precursors thereof.

(6) Example 6

A positive electrode active material was prepared in the same manner as described in Example 1, except that the mixture of Example 1 and $Al_2O_3$, $TiO_2$ and $ZrO_2$ were mixed to contain Al, Ti and Zr in a bimodal-type positive electrode active material, thermally treated for 8 hours by raising a temperature 2° C. per minute until 680° C. in a calcination furnace while maintaining an $O_2$ atmosphere, and then naturally cooled.

Here, the Al+Ti+Zr was mixed to be a content of 2.0 mol % in the positive electrode active material.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 6 below.

The compositions of the first lithium composite oxide and the second lithium composite oxide shown in Table 6 below were measured by individual calcination of the small particle precursor and the large particle precursor, and separately, the composition of the bimodal lithium composite oxide is shown as an average composition of the lithium composite oxide among a calcination product (positive electrode active material) for the mixture in which the small particle precursor and the large particle precursor are mixed in a weight ratio of 20:80.

TABLE 6

| Mole fraction | First lithium composite oxide | Second lithium composite oxide |
|---|---|---|
| Ni/(Ni + Co + Mn + M) | 84.0 | 88.1 |
| Co/(Ni + Co + Mn + M) | 12.5 | 8.4 |
| Mn/(Ni + Co + Mn + M) | 1.5 | 1.5 |
| Al, Ti, Zr/(Ni + Co + Mn + Al, Ti, Zr) | 2.0 | 2.0 |

| Mole fraction | Bimodal (2:8 weight ratio) lithium composite oxide |
|---|---|
| Ni/(Ni + Co + Mn) | 87.5 |
| Co/(Ni + Co + Mn) | 9.0 |
| Mn/(Ni + Co + Mn) | 1.5 |
| Al, Ti, Zr/(Ni + Co + Mn + Al, Ti, Zr) | 2.0 |

Referring to Table 6, it can be confirmed that the compositions of the first lithium composite oxide and the second lithium composite oxide were not significantly changed from the compositions of the precursors thereof.

(7) Example 7

A positive electrode active material was prepared in the same manner as described in Example 1, except that an Nb-containing raw material ($Nb_2O_5$) was further added before calcination of the precursor mixture and then calcined. Here, the Nb-containing raw material ($Nb_2O_5$) was mixed such that the Nb content in each of the first lithium composite oxide and the second lithium composite oxide was 0.5 mol %.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 7 below.

The compositions of the first lithium composite oxide and the second lithium composite oxide shown in Table 7 below were measured by individual calcination of the small particle precursor and the large particle precursor, and separately, the composition of the bimodal lithium composite oxide is shown as an average composition of the lithium composite oxide among a calcination product (positive electrode active material) for the mixture in which the small particle precursor and the large particle precursor are mixed in a weight ratio of 20:80.

TABLE 7

| Mole fraction | First lithium composite oxide | Second lithium composite oxide |
|---|---|---|
| Ni/(Ni + Co + Mn + M) | 84.8 | 89.5 |
| Co/(Ni + Co + Mn + M) | 13.2 | 8.5 |
| Mn/(Ni + Co + Mn + M) | 1.5 | 1.5 |
| Nb/(Ni + Co + Mn + Nb) | 0.5 | 0.5 |

| Mole fraction | Bimodal (2:8 weight ratio) lithium composite oxide |
|---|---|
| Ni/(Ni + Co + Mn + M) | 88.6 |
| Co/(Ni + Co + Mn + M) | 9.4 |
| Mn/(Ni + Co + Mn + M) | 1.5 |
| Nb/(Ni + Co + Mn + Nb) | 0.5 |

Referring to Table 7, it can be confirmed that the compositions of the first lithium composite oxide and the second lithium composite oxide were not significantly changed from the compositions of the precursors thereof.

(8) Example 8

A bimodal-type positive electrode active material was prepared in the same manner as described in Example 3, except that the weight ratio of the small particle precursor and the large particle precursor in the hydroxide precursor was controlled to be 10:90.

The ICP analysis results for the composition of the bimodal-type positive electrode active material is shown in Table 8 below. The composition of the bimodal lithium composite oxide is shown as an average composition of the lithium composite oxide among a calcination product (positive electrode active material) for the mixture in which the small particle precursor and the large particle precursor are mixed in a weight ratio of 10:90.

TABLE 8

| Mole fraction | Bimodal (1:9 weight ratio) lithium composite oxide |
|---|---|
| Ni/(Ni + Co + Mn) | 89.1 |
| Co/(Ni + Co + Mn) | 9.1 |
| Mn/(Ni + Co + Mn) | 1.5 |
| B/(Ni + Co + Mn + B) | 0.3 |

(9) Example 9

A bimodal-type positive electrode active material was prepared in the same manner as described in Example 3, except that the weight ratio of the small particle precursor and the large particle precursor in the hydroxide precursor was controlled to be 30:70.

The ICP analysis results for the composition of the bimodal-type positive electrode active material are shown in Table 9 below. The composition of the bimodal lithium composite oxide is shown as an average composition of the lithium composite oxide among a calcination product (positive electrode active material) for the mixture in which the small particle precursor and the large particle precursor are mixed in a weight ratio of 30:70.

TABLE 9

| Mole fraction | Bimodal (3:7 weight ratio) lithium composite oxide |
|---|---|
| Ni/(Ni + Co + Mn) | 88.2 |
| Co/(Ni + Co + Mn) | 10.0 |
| Mn/(Ni + Co + Mn) | 1.5 |
| B/(Ni + Co + Mn + B) | 0.3 |

(10) Comparative Example 1

A positive electrode active material was prepared in the same manner as described in Example 1, except that a hydroxide precursor of a first lithium composite oxide which is a small particle and a second lithium composite oxide which is a large particle was synthesized with the composition listed in Table 10 below.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 10 below.

The compositions of the first lithium composite oxide and the second lithium composite oxide shown in Table 10 below were measured by individual calcination of the small particle precursor and the large particle precursor, and separately, the composition of the bimodal lithium composite oxide is shown as an average composition of the lithium composite oxide among a calcination product (positive electrode active material) for the mixture in which the small particle precursor and the large particle precursor are mixed in a weight ratio of 20:80.

TABLE 10

| Classification | Small particle precursor | Large particle precursor |
|---|---|---|
| Ni (mol %) | 85.4 | 90.0 |
| Co (mol %) | 10.6 | 8.5 |
| Mn (mol %) | 4.0 | 1.5 |

| Mole fraction | First lithium composite oxide | Second lithium composite oxide |
|---|---|---|
| Ni/(Ni + Co + Mn) | 85.6 | 89.9 |
| Co/(Ni + Co + Mn) | 10.3 | 8.6 |
| Mn/(Ni + Co + Mn) | 4.1 | 1.5 |

| Mole fraction | Bimodal (2:8 weight ratio) lithium composite oxide |
|---|---|
| Ni/(Ni + Co + Mn) | 88.7 |
| Co/(Ni + Co + Mn) | 9.2 |
| Mn/(Ni + Co + Mn) | 2.1 |

(11) Comparative Example 2

A positive electrode active material was prepared in the same manner as described in Example 1, except that a hydroxide precursor of a first lithium composite oxide which is a small particle and a second lithium composite oxide which is a large particle was synthesized with the composition listed in Table 11 below.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 11 below.

The compositions of the first lithium composite oxide and the second lithium composite oxide shown in Table 11 below were measured by individual calcination of the small particle precursor and the large particle precursor, and separately, the composition of the bimodal lithium composite oxide is shown as an average composition of the lithium composite oxide among a calcination product (positive electrode active material) for the mixture in which the small particle precursor and the large particle precursor are mixed in a weight ratio of 20:80.

TABLE 11

| Classification | Small particle precursor | Large particle precursor |
|---|---|---|
| Ni (mol %) | 86.4 | 90.0 |
| Co (mol %) | 5.7 | 8.5 |
| Mn (mol %) | 7.8 | 1.5 |

| Mole fraction | First lithium composite oxide | Second lithium composite oxide |
|---|---|---|
| Ni/(Ni + Co + Mn) | 86.0 | 89.9 |
| Co/(Ni + Co + Mn) | 6.0 | 8.6 |
| Mn/(Ni + Co + Mn) | 8.0 | 1.5 |

| Mole fraction | Bimodal (2:8 weight ratio) lithium composite oxide |
|---|---|
| Ni/(Ni + Co + Mn) | 88.7 |
| Co/(Ni + Co + Mn) | 8.4 |
| Mn/(Ni + Co + Mn) | 2.9 |

(12) Comparative Example 3

A positive electrode active material was prepared in the same manner as described in Example 3, except that a hydroxide precursor of a first lithium composite oxide which is a small particle and a second lithium composite oxide which is a large particle was synthesized with the composition listed in Table 12 below.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 12 below.

The compositions of the first lithium composite oxide and the second lithium composite oxide shown in Table 12 below were measured by individual calcination of the small particle precursor and the large particle precursor, and separately, the composition of the bimodal lithium composite oxide is shown as an average composition of the lithium composite oxide among a calcination product (positive electrode active material) for the mixture in which the small particle precursor and the large particle precursor are mixed in a weight ratio of 20:80.

TABLE 12

| Classification | Small particle precursor | Large particle precursor |
|---|---|---|
| Ni (mol %) | 85.4 | 90.0 |
| Co (mol %) | 10.6 | 8.5 |
| Mn (mol %) | 4.0 | 1.5 |

| Mole traction | First lithium composite oxide | Second lithium composite oxide |
|---|---|---|
| Ni/(Ni + Co + Mn) | 85.4 | 89.6 |
| Co/(Ni + Co + Mn) | 10.3 | 8.6 |
| Mn/(Ni + Co + Mn) | 4.0 | 1.5 |
| B/(Ni + Co + Mn + B) | 0.3 | 0.3 |

| Mole fraction | Bimodal (2:8 weight ratio) lithium composite oxide |
|---|---|
| Ni/(Ni + Co + Mn) | 88.7 |
| Co/(Ni + Co + Mn) | 9.0 |
| Mn/(Ni + Co + Mn) | 2.0 |
| B/(Ni + Co + Mn + B) | 0.3 |

(13) Comparative Example 4

A positive electrode active material was prepared in the same manner as described in Example 3, except that a hydroxide precursor of a first lithium composite oxide which is a small particle and a second lithium composite oxide which is a large particle was synthesized with the composition listed in Table 13 below.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 13 below.

The compositions of the first lithium composite oxide and the second lithium composite oxide shown in Table 13 below were measured by individual calcination of the small particle precursor and the large particle precursor, and separately, the composition of the bimodal lithium composite oxide is shown as an average composition of the lithium composite oxide among a calcination product (positive electrode active material) for the mixture in which the small particle precursor and the large particle precursor are mixed in a weight ratio of 20:80.

TABLE 13

| Classification | Small particle precursor | Large particle precursor |
|---|---|---|
| Ni (mol %) | 86.4 | 90.0 |
| Co (mol %) | 5.7 | 8.5 |
| Mn (mol %) | 7.8 | 1.5 |

| Mole fraction | First lithium composite oxide | Second lithium composite oxide |
|---|---|---|
| Ni/(Ni + Co + Mn) | 85.9 | 89.6 |
| Co/(Ni + Co + Mn) | 5.9 | 8.6 |
| Mn/(Ni + Co + Mn) | 7.9 | 1.5 |
| B/(Ni + Co + Mn + B) | 0.3 | 0.3 |

| Mole fraction | Bimodal (2:8 weight ratio) lithium composite oxide |
|---|---|
| Ni/(Ni + Co + Mn) | 88.8 |
| Co/(Ni + Co + Mn) | 8.0 |

TABLE 13-continued

| | |
|---|---|
| Mn/(Ni + Co + Mn) | 2.9 |
| B/(Ni + Co + Mn + B) | 0.3 |

(14) Comparative Example 5

A positive electrode active material was prepared in the same manner as described in Example 3, except that a hydroxide precursor of a first lithium composite oxide which is a small particle and a second lithium composite oxide which is a large particle was synthesized with the composition listed in Table 14 below.

ICP analysis results for the composition of the hydroxide precursor of the first lithium composite oxide and the second lithium composite oxide, the compositions of the first lithium composite oxide and the second lithium composite oxide, which are calcination products of the precursor, and the composition of the bimodal-type positive electrode active material are shown in Table 14 below.

The compositions of the first lithium composite oxide and the second lithium composite oxide shown in Table 14 below were measured by individual calcination of the small particle precursor and the large particle precursor, and separately, the composition of the bimodal lithium composite oxide is shown as an average composition of the lithium composite oxide among a calcination product (positive electrode active material) for the mixture in which the small particle precursor and the large particle precursor are mixed in a weight ratio of 20:80.

TABLE 14

| Classification | Small particle precursor | Large particle precursor |
|---|---|---|
| Ni (mol %) | 85.1 | 89.2 |
| Co (mol %) | 13.4 | 5.3 |
| Mn (mol %) | 1.5 | 5.5 |

| Mole fraction | First lithium composite oxide | Second lithium composite oxide |
|---|---|---|
| Ni/(Ni + Co + Mn) | 85.0 | 88.8 |
| Co/(Ni + Co + Mn) | 13.1 | 5.5 |
| Mn/(Ni + Co + Mn) | 1.6 | 5.5 |
| B/(Ni + Co + Mn + B) | 0.3 | 0.3 |

| Mole fraction | Bimodal (2:8 weight ratio) lithium composite oxide |
|---|---|
| Ni/(Ni + Co + Mn) | 87.9 |
| Co/(Ni + Co + Mn) | 7.1 |
| Mn/(Ni + Co + Mn) | 4.7 |
| B/(Ni + Co + Mn + B) | 0.3 |

Preparation Example 2. Production of Lithium Secondary Battery

A positive electrode slurry was prepared by dispersing 92 wt % of each of the positive electrode active materials prepared according to Preparation Example 1, 4 wt % of artificial graphite and 4 wt % of PVDF binder in 30 g of N-methyl-2-pyrrolidone (NMP). The positive electrode slurry was uniformly applied onto an aluminum thin film having a thickness of 15 μm, and vacuum-dried at 135° C., thereby manufacturing a positive electrode for a lithium secondary battery.

A coin battery was produced using a lithium foil as a counter electrode for the positive electrode, a porous polyethylene film (Celgard 2300, thickness: 25 μm) as a separator, and an electrolyte in which $LiPF_6$ was present at a concentration of 1.15M in a solvent in which ethylene carbonate and ethyl methyl carbonate are mixed in a volume ratio of 3:7 was used.

Experimental Example 1. EDS and XPS Analyses for Positive Electrode Active Material (1) Analysis of Ni, Co and Mn Contents in Positive Electrode Active Material To measure the distribution and content of a metal element in the positive electrode active material according to Example 3 among the positive electrode active materials prepared according to Preparation Example 1, energy dispersive spectroscopy (EDS) analysis was performed.

Through the EDS analysis, the distribution and content of a metal element in each region from the center to the surface of a lithium composite oxide constituting the positive electrode active material may be confirmed.

The EDS analysis was performed after cross-sectional SEM images for the first lithium composite oxide which is a small particle and the second lithium composite oxide which is the large particle of the positive electrode active material according to Example 3 were obtained using FE-SEM (Bruker), and the contents of Ni, Co and Mn contents from the center to the surface of the small and large particles were quantified from the cross-sectional SEM images.

Figure 2:
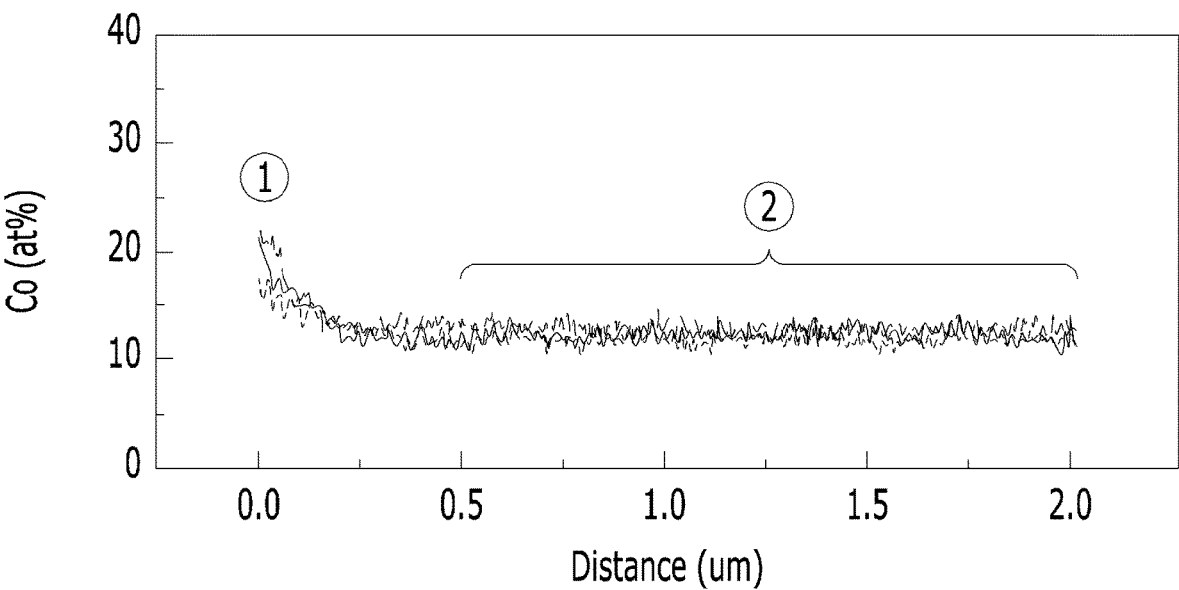
Figure 3:
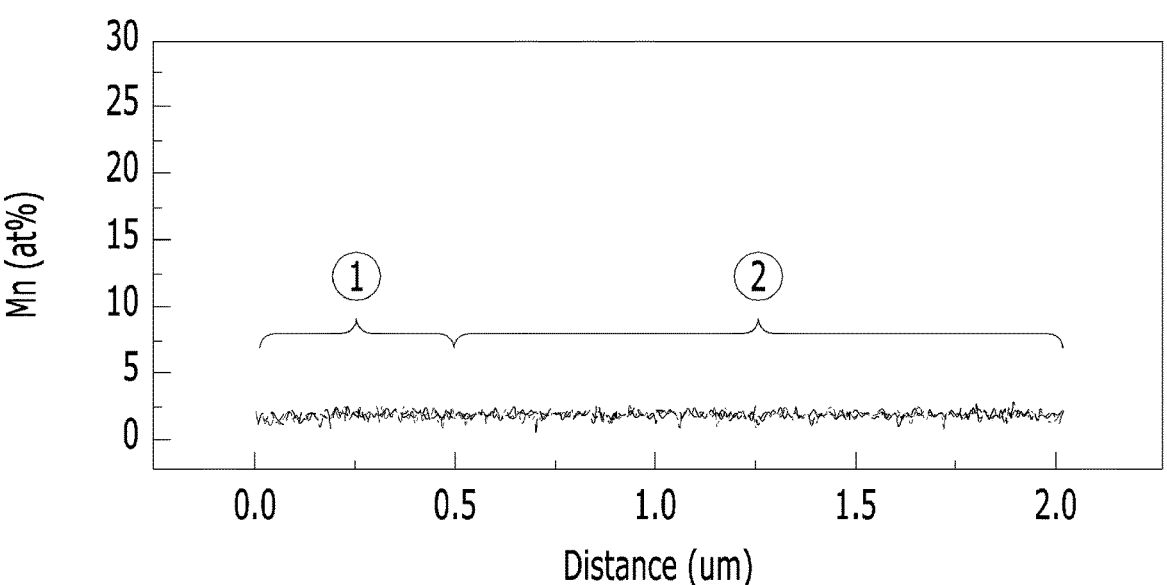

FIGS. 1 to 3 are graphs showing EDS analysis results for the distribution and contents of metal elements according to a location in a particle for a first lithium composite oxide, which is a small particle, of a positive electrode active material according to Example 3.

Referring to FIGS. 1 to 3, it can be confirmed that the Ni content in the small particle has a concentration gradient increasing from the center to the surface of the small particle, and the Co content has a concentration gradient decreasing from the center to the surface of the small particle. Meanwhile, the Mn content in the small particle may have a constant concentration from the center to the surface of the small particle, unlike the Ni and Co contents.

Like this, as the Mn content in the particle has a constant concentration from the center to the surface thereof, the elution of Mn in the particle into the electrolyte may be reduced.

Figure 4:
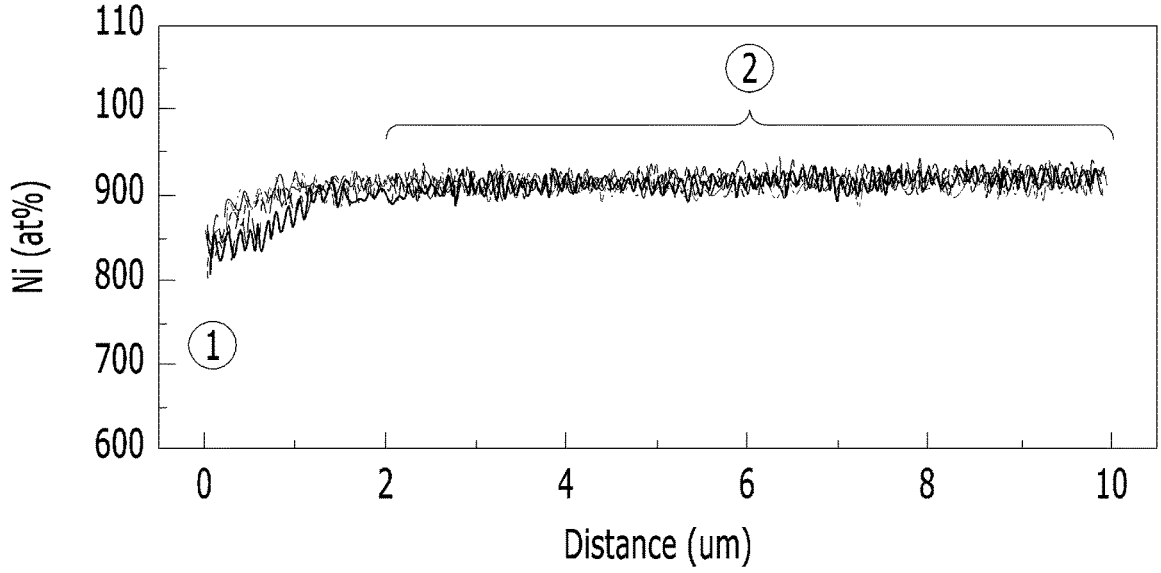
FIGS. 4 to 6 are graphs showing EDS analysis results for the distribution and contents of metal elements according to a location in a particle for a second lithium composite oxide, which is a large particle, of the positive electrode active material according to Example 3.
Figure 5:
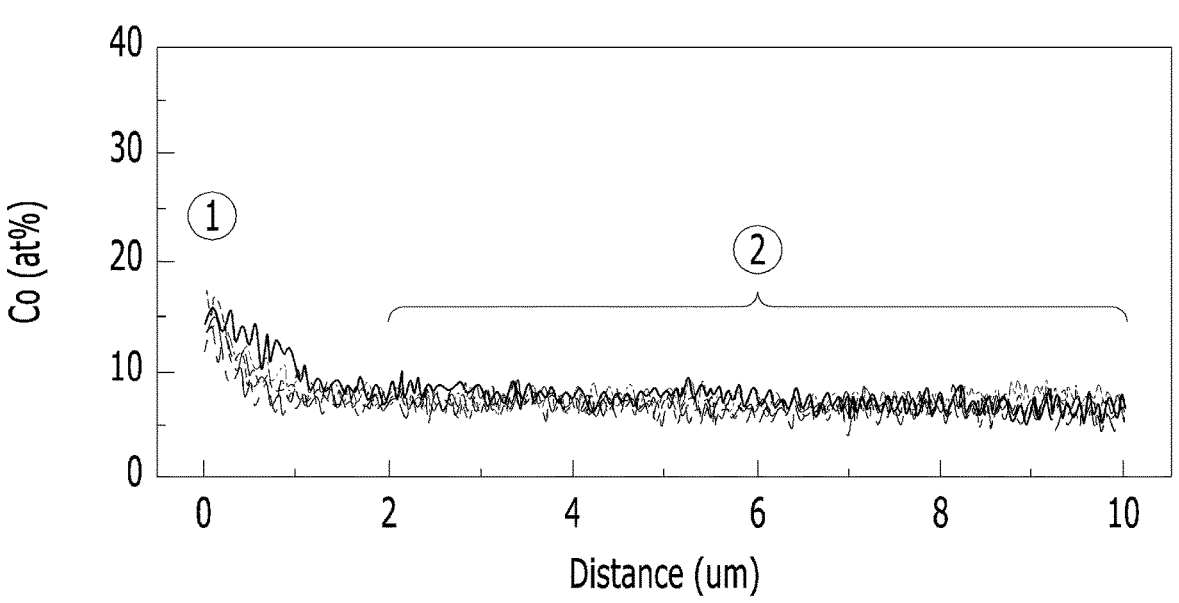
Figure 6:
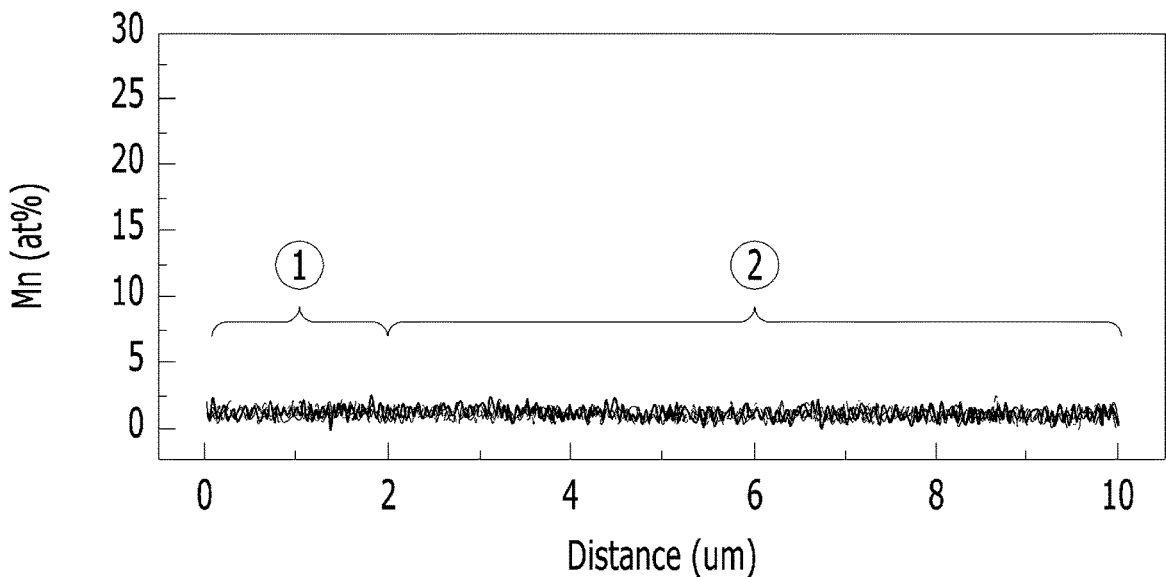

FIGS. 4 to 6 are graphs showing EDS analysis results for the distribution and contents of metal elements according to a location in a particle for a second lithium composite oxide, which is a large particle, of the positive electrode active material according to Example 3.

Referring to FIGS. 4 to 6, it can be confirmed that the large particle exhibits the same Ni and Co concentration gradients as the small particle, and the Mn content in the large particle has a constant concentration from the center to the surface of the small particle, unlike the Ni and Co contents.

(2) Analysis of Content of Coating Material in Positive Electrode Active Material The positive electrode active material according to Example 3 of Preparation Example 1 had a B-containing coating layer formed on the surfaces of the first lithium composite oxide and the second lithium composite oxide by mixing a mixture of the first lithium composite oxide which is a small particle and the second lithium composite oxide which is a large particle with a B-containing raw material ($H_3BO_3$) and calcining the resulting mixture.

Accordingly, to confirm whether the B-containing coating layer was formed on the surfaces of the first lithium composite oxide and the second lithium composite oxide and the distribution of the B-containing coating layer, X-ray photoelectron spectroscopy (XPS) was performed. The XPS was performed using Quantum 2000 (Physical Electronics. Inc.; accelerating voltage: 0.5 to 15 keV, 300 W, energy resolution: approximately 1.0 eV, sputter rate: 0.1 nm/min).

Figure 7:
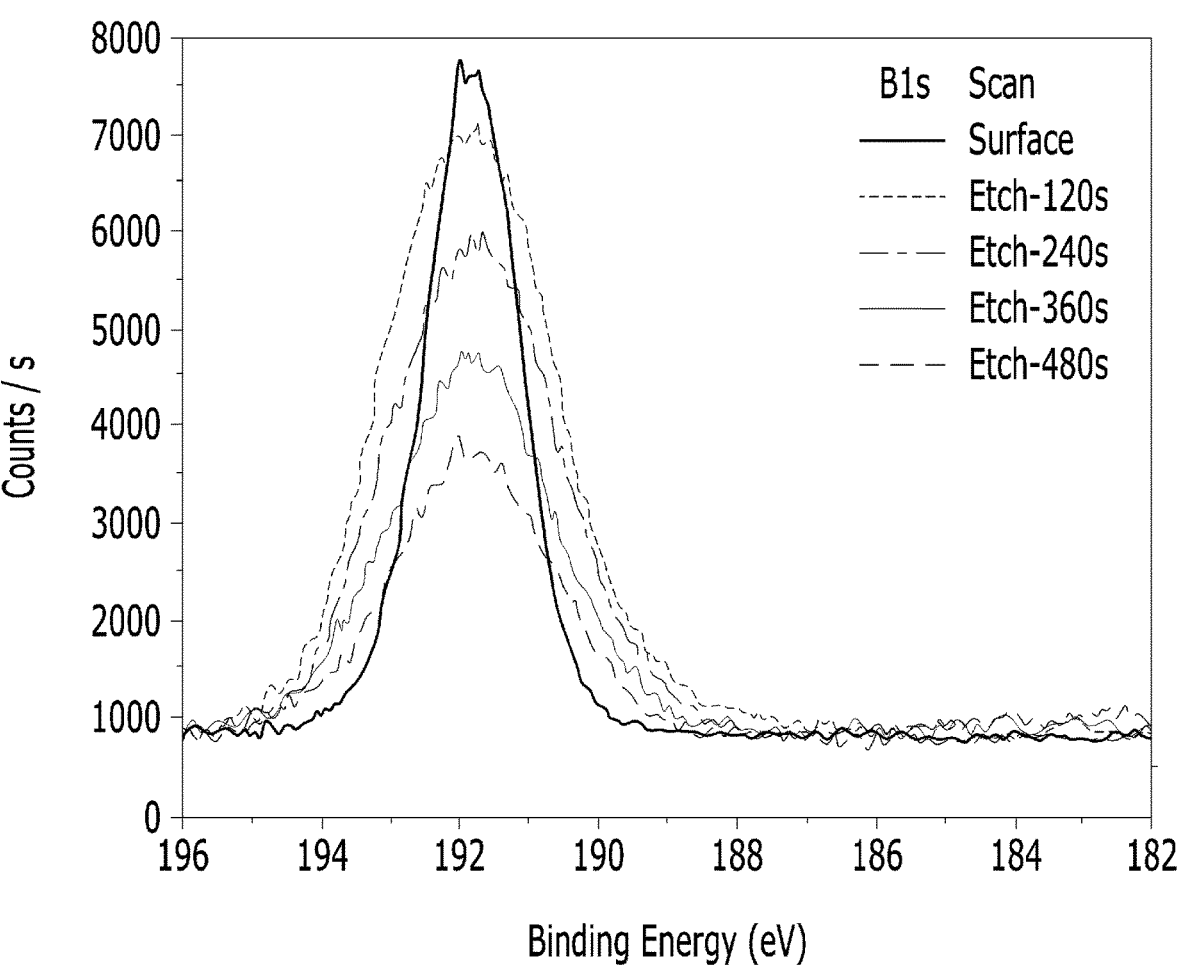
FIG. 7 is a graph showing an XPS analysis result for the distribution and content of B in a lithium composite oxide of the positive electrode active material according to Example 3.

FIG. 7 is a graph showing an XPS analysis result for B distribution and content in a lithium composite oxide of the positive electrode active material according to Example 3.

Referring to FIG. 7, as a result of XPS for the positive electrode active material according to Example 3, a B1s peak was observed, confirming that a B-containing coating layer is formed on the surfaces of the first lithium composite oxide and the second lithium composite oxide, which constitute the positive electrode active material.

In addition, as a result of measuring the content of element B over etching time while the surfaces of the first lithium composite oxide and the second lithium composite oxide, which constitute the positive electrode active material, were etched, a concentration gradient in which the concentration of the element B decreases from the surfaces of the first lithium composite oxide and the second lithium composite oxide the centers of the first lithium composite oxide and the second lithium composite oxide as the etching time increases may be confirmed.

Meanwhile, the positive electrode active material according to Example 6 of Preparation Example 1 has an Al, Ti and Zr-containing composite coating layer formed on the surfaces of the first lithium composite oxide and the second lithium composite oxide by mixing a mixture of the first lithium composite oxide which is a small particle and the second lithium composite oxide which is a large particle with $Al_2O_3$, $TiO_2$ and $ZrO_2$ and calcining the resulting mixture.

Accordingly, to confirm whether the Al, Ti and Zr-containing coating layer was formed on the surfaces of the first lithium composite oxide and the second lithium composite oxide and the distribution of the Al, Ti and Zr-containing coating layer, EDS was performed.

Figure 8:
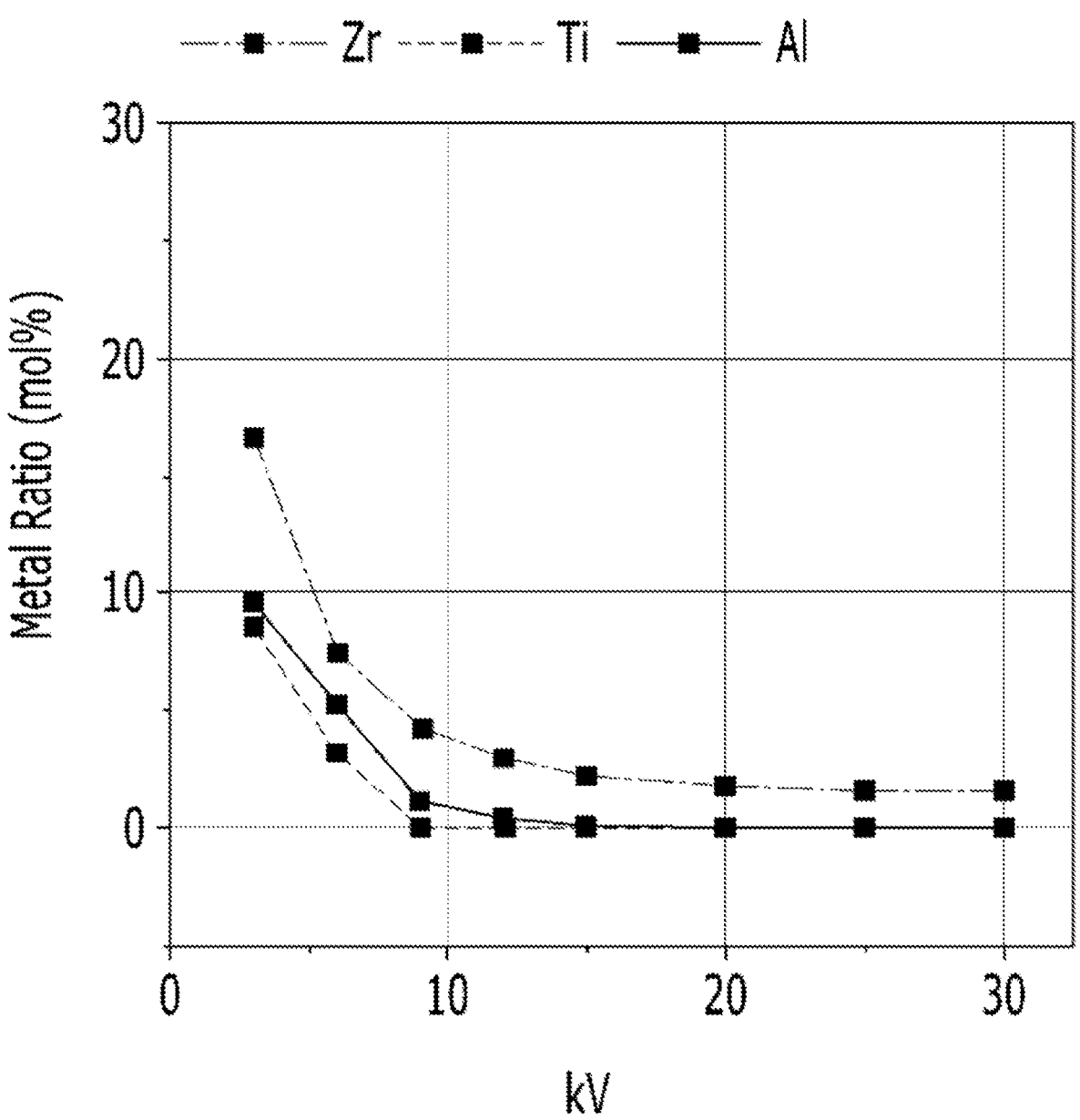
FIG. 8 is a graph showing an EDS analysis result for the distribution and contents of Al, Ti and Zr in a lithium composite oxide of a positive electrode active material according to Example 6.

FIG. 8 is a graph showing an EDS analysis result for Al, Ti and Zr distribution and contents in a lithium composite oxide of a positive electrode active material according to Example 6.

Referring to FIG. 8, as contents (metal ratio) of the Al, Ti and Zr elements are confirmed on the surface of the positive electrode active material according to Example 6, it can be confirmed that an Al, Ti and Zr-containing coating layer is formed on the surfaces of the first lithium composite oxide and the second lithium composite oxide, which constitute the positive electrode active material.

In addition, referring to the EDS result according to the accelerating voltage of FE-SEM (analysis of the concentration of a metal element per depth from the surface to the center of the lithium composite oxide, 30 kV=approximately 1 μm), a concentration gradient in which the concentrations of the Al, Ti and Zr elements decrease from the surfaces of the first lithium composite oxide and the second lithium composite oxide to the center of the first lithium composite oxide and the second lithium composite oxide can be confirmed.

Experimental Example 2. Analysis of Average Particle Diameter and Particle Size Distribution of Positive Electrode Active Material The average particle diameter of each positive electrode active material prepared according to Preparation Example 1 was measured using a laser diffraction-type particle size analyzer (Clias). The result is shown in Table 15 below.

TABLE 15

| Classi-fication | Mn content (Δmol %) | Weight ratio of small particle:large particle (%) | D50 (μm) | Histogram (%) | |
|---|---|---|---|---|---|
| | | | | Proportion of small particle | Proportion of large particle |
| Example 1 | 0.00 | 20:80 | 13.97 | 20.03 | 79.97 |
| Example 2 | 0.50 | 20:80 | 13.96 | 19.97 | 80.03 |
| Example 3 | 0.00 | 20:80 | 13.97 | 20.01 | 79.99 |
| Example 4 | 1.00 | 20:80 | 13.96 | 19.88 | 80.12 |
| Example 5 | 2.00 | 20:80 | 13.97 | 19.90 | 80.10 |
| Example 6 | 0.00 | 20:80 | 13.97 | 19.99 | 80.01 |
| Example 7 | 0.00 | 20:80 | 13.97 | 19.98 | 80.02 |
| Example 8 | 0.00 | 10:90 | 15.09 | 20.00 | 80.00 |
| Example 9 | 0.00 | 30:70 | 12.75 | 19.96 | 80.04 |
| Comparative Example 1 | 2.60 | 20:80 | 14.05 | 19.05 | 80.95 |
| Comparative Example 2 | 6.50 | 20:80 | 14.11 | 17.69 | 82.31 |
| Comparative Example 3 | 2.60 | 20:80 | 14.06 | 18.64 | 81.36 |
| Comparative Example 4 | 6.50 | 20:80 | 14.15 | 17.60 | 82.40 |
| Comparative Example 5 | 4.00 | 20:80 | 14.07 | 18.01 | 81.99 |

Δmol %: $|\alpha(\text{mol \%}) - \beta(\text{mol \%})|$

α: Mn concentration in first lithium composite oxide

β: Mn concentration in second lithium composite oxide

D50: 50% particle diameter (average particle diameter) of cumulative particle size distribution by volume Small particle proportion: Cumulative particle size distribution (%) of particle (first lithium composite oxide) having average particle diameter of 8.0 μm or less Large particle proportion: Cumulative particle size distribution (%) of particle (second lithium composite oxide) having average particle diameter of 8.5 μm or more Referring to the result of Table 15, as the difference in Mn concentration between the first lithium composite oxide and the second lithium composite oxide increases, the average particle diameter (D50) tends to be slightly increased, and particularly, as a ratio of the second lithium composite oxide which is a large particle to the first lithium composite oxide which is a small particle increases, it can be confirmed that there is a particle size deviation.

It can be confirmed that this result is caused by excessive calcination for any one of the small and large particles as the deviation of the Mn elements in the small and large particles of the bimodal-type positive electrode active material increases.

Experimental Example 3. Evaluation of Battery Capacity and Lifetime Characteristics of Lithium Secondary Battery The resistance of the lithium secondary battery manufactured according to Preparation Example 2 was measured within a frequency (10 kHz to 0.01 Hz) range using electrochemical impedance spectroscopy (EIS).

In addition, 50 cycles of charging/discharging were performed on the same lithium secondary battery at 25° C., within a driving voltage range of 3.0V to 4.4V under a 1C/1C condition, and a ratio of the discharge capacity at 50 cycles with respect to the initial capacity (cycle capacity retention) was measured.

The measurement results are shown in Table 16 below.

TABLE 16

| Classification | Mn content (Δmol %) | Imp. (ohms) | Retention@50 cy (%) |
|---|---|---|---|
| Example 1 | 0.00 | 8.2 | 93.7 |
| Example 2 | 0.50 | 8.5 | 93.2 |
| Example 3 | 0.00 | 6.7 | 96.0 |
| Example 4 | 1.00 | 7.0 | 95.3 |
| Example 5 | 2.00 | 7.3 | 95.1 |
| Example 6 | 0.00 | 8.5 | 93.4 |
| Example 7 | 0.00 | 8.3 | 93.2 |
| Example 8 | 0.00 | 8.5 | 93.1 |
| Example 9 | 0.00 | 7.9 | 93.8 |
| Comparative Example 1 | 2.60 | 9.5 | 92.8 |
| Comparative Example 2 | 6.50 | 13.8 | 91.0 |
| Comparative Example 3 | 2.60 | 9.0 | 92.8 |
| Comparative Example 4 | 6.50 | 12.9 | 90.9 |
| Comparative Example 5 | 4.00 | 11.3 | 91.6 |

Referring to Table 16, in the bimodal-type positive electrode active material, as excessive calcination for any one of the small and large particles during simultaneous calcination is inhibited, it can be confirmed that the particle size deviation between the first lithium composite oxide and the second lithium composite oxide, which constitute the positive electrode active material, is reduced, resulting in improvement of impedance and lifetime characteristics.

A positive electrode active material according to various embodiments of the present invention is a bimodal-type positive electrode active material including a first lithium composite oxide which is a small particle, and a second lithium composite oxide which is a large particle, the particles having different average particle diameters. As voids between large particles can be filled with small particles with a relatively smaller average particle diameter, the integration density of the lithium composite oxide in a unit volume can be enhanced, thereby increasing an energy density per unit volume.

In addition, according to the present invention, excessive calcination for any one of small and large particles can be prevented by reducing the deviation of metal elements in the small and large particles of the bimodal-type positive electrode active material. Accordingly, the difference in average particle diameter of the small particles and/or the large particles before and after calcination of the bimodal-type positive electrode active material or deterioration of the positive electrode active material can be prevented in advance.

As described above, the prevention of excessive deviation in average particle diameter between the small particles and/or the large particles before and after calcination or deterioration caused by excessive calcination of the small particle and/or the large particle can have positive effect on the lifetime, impedance and stability of a lithium secondary battery using the bimodal-type positive electrode active material.

In the above, the embodiments of the present invention have been described, but it will be understood by those of ordinary skill in the art that the present invention may be changed and modified in various ways by addition, alternation, or deletion of components without departing from the spirit of the present invention defined in the appended claims.

What is claimed is:

1. A bimodal-type positive electrode active material comprising a first lithium composite oxide which is a small particle and a second lithium composite oxide which is a large particle, wherein the bimodal-type positive electrode active material is prepared by simultaneous calcination of a mixture of a first hydroxide precursor which is a precursor of the first lithium composite oxide, and a second hydroxide precursor which is a precursor of the second lithium composite oxide, wherein an Mn concentration ($\alpha$) in the first lithium composite oxide and an Mn concentration ($\beta$) in the second lithium composite oxide satisfy Equation 1 below:

$$|\alpha(\text{mol }\%)-\beta(\text{mol }\%)|\leq 2.0, \qquad \text{[Equation 1]}$$

wherein the first lithium composite oxide and the second lithium composite oxide are represented by Formula 1 below:

$$\text{Li}_w\text{Ni}_{1-(x+y+z)}\text{Co}_x\text{Mn}_y\text{M1}_z\text{O}_{2+\delta}, \qquad \text{[Formula 1]}$$

wherein M1 is at least one selected from P, Sr, Ba, B, Ti, Zr, W, Ce, Hf, Ta, Cr, F, Mg, Cr, V, Fe, Zn, Si, Y, Ga, Sn, Mo, Ge, Nd, Gd and Cu, $0.5\leq w\leq 1.5$, $0<y\leq 0.046$, $0\leq x+y+z\leq 0.15$, and $0\leq\delta\leq 0.02$, and wherein the mole fraction of nickel ($\text{Ni}/(\text{Ni}+\text{Mn}+\text{Co}+\text{M1})$) calculated from an average composition of the bimodal-type positive electrode active material satisfies Equation 2 below:

$$\text{Ni}/(\text{Ni}+\text{Mn}+\text{Co}+\text{M1})\geq 85.0, \qquad \text{[Equation 2]}$$

wherein the mole fraction of nickel ($\text{Ni}/(\text{Ni}+\text{Mn}+\text{Co}+\text{M1})$) calculated from the second lithium composite oxide is larger than the mole fraction of nickel ($\text{Ni}/(\text{Ni}+\text{Mn}+\text{Co}+\text{M1})$) calculated from the first lithium composite oxide, wherein the difference (mol %) between the mole fraction of nickel ($\text{Ni}/(\text{Ni}+\text{Mn}+\text{Co}+\text{M1})$) calculated from the second lithium composite oxide and the mole fraction of nickel ($\text{Ni}/(\text{Ni}+\text{Mn}+\text{Co}+\text{M1})$) calculated from the first lithium composite oxide is 4.1 or more, wherein the mole fraction of manganese ($\text{Mn}/(\text{Ni}+\text{Mn}+\text{Co}+\text{M1})$) calculated from the first lithium composite oxide is larger than the mole fraction of manganese ($\text{Mn}/(\text{Ni}+\text{Mn}+\text{Co}+\text{M1})$) calculated from the second lithium composite oxide, wherein the first lithium composite oxide and the second lithium composite oxide have a concentration gradient in which the concentration of Ni is decreased from the center to the surface of the particle, and the concentration of Co is increased from the center to the surface of the particle, and wherein the first lithium composite oxide and the second lithium composite oxide have a constant Mn concentration from the center to the surface of the particle.

2. The positive electrode active material of claim 1, wherein the Ni, Co and Mn concentration (mol %) in at least one of the first lithium composite oxide and the second lithium composite oxide satisfies Equation 2 below:

$$\text{Ni}/(\text{Ni}+\text{Mn}+\text{Co})\geq 85.0. \qquad \text{[Equation 2]}$$

3. The positive electrode active material of claim 1, wherein an average particle diameter (D50) of the first lithium composite oxide is 8 $\mu$m or less.

4. The positive electrode active material of claim 1, wherein an average particle diameter (D50) of the second lithium composite oxide is 8.5 $\mu$m or more.

5. The positive electrode active material of claim 1, wherein a weight ratio of the first lithium composite oxide and the second lithium composite oxide in the positive electrode active material is 5:95 to 50:50.

6. The positive electrode active material of claim 1, wherein the first lithium composite oxide and the second lithium composite oxide comprise a primary particle enabling intercalation/deintercalation of lithium and a secondary particle in which the primary particles are aggregated, at least one of the first lithium composite oxide and the second lithium composite oxide comprises a coating layer covering at least a part of the region selected from the interface between the primary particles and the surface of the secondary particle, and the coating layer comprises at least one lithium alloy oxide represented by Formula 2 below, $$\text{Li}_a\text{M2}_b\text{O}_c, \qquad \text{[Formula 2]}$$

wherein M2 is at least one selected from Ni, Mn, Co, Fe, Cu, Nb, Mo, Ti, Al, Cr, Zr, Zn, Na, K, Ca, Mg, Pt, Au, B, P, Eu, Sm, W, V, Ba, Ta, Sn, Hf, Ce, Gd and Nd, $0\leq a\leq 10$, $0\leq b\leq 8$, and $2\leq c\leq 13$.

7. The positive electrode active material of claim 6, wherein the coating layer has a thickness of 0.15 $\mu$m or more.

8. The positive electrode active material of claim 6, wherein the lithium alloy oxide has a concentration gradient decreasing from the surface to the center of the secondary particle.

9. A positive electrode comprising the positive electrode active material of claim 1.

10. A lithium secondary battery using the positive electrode of claim 9.

* * * * *